United States Patent
Liu et al.

(10) Patent No.: US 7,646,169 B2
(45) Date of Patent: Jan. 12, 2010

(54) TRICKLE DISCHARGE FOR BATTERY PACK PROTECTION

(75) Inventors: Liusheng Liu, San Jose, CA (US); Bruce Denning, Fallbrook, CA (US)

(73) Assignee: O2Micro International Ltd., Georgetown (KY)

( * ) Notice: Subject to any disclaimer, the term of this patent is extended or adjusted under 35 U.S.C. 154(b) by 389 days.

(21) Appl. No.: 11/540,236

(22) Filed: Sep. 29, 2006

(65) Prior Publication Data
US 2007/0024243 A1    Feb. 1, 2007

Related U.S. Application Data

(63) Continuation-in-part of application No. 10/832,621, filed on Apr. 27, 2004, now Pat. No. 7,180,268.

(60) Provisional application No. 60/556,254, filed on Mar. 25, 2004.

(51) Int. Cl.
*H02J 7/00* (2006.01)
(52) U.S. Cl. ...................... 320/127; 320/135
(58) Field of Classification Search ............... 320/118, 320/127, 129, 134, 135, 136
See application file for complete search history.

(56) References Cited

U.S. PATENT DOCUMENTS

| | | | |
|---|---|---|---|
| 5,867,008 A * | 2/1999 | Du et al. | 320/136 |
| 5,903,137 A * | 5/1999 | Freiman et al. | 320/163 |
| 6,492,792 B1 * | 12/2002 | Johnson et al. | 320/136 |
| 6,531,847 B1 * | 3/2003 | Tsukamoto et al. | 320/135 |
| 6,603,286 B2 * | 8/2003 | Herrmann et al. | 320/134 |
| 2003/0132732 A1 | 7/2003 | Thomas et al. | |
| 2003/0214821 A1 | 11/2003 | Giannopoulos et al. | |

FOREIGN PATENT DOCUMENTS

| | | |
|---|---|---|
| JP | H08-140281 | 5/1996 |
| JP | H09-070145 | 3/1997 |
| JP | 2001-190028 | 7/2001 |

\* cited by examiner

*Primary Examiner*—Edward Tso
*Assistant Examiner*—M'Baye Diao
(74) *Attorney, Agent, or Firm*—Wang Law Firm, Inc.; Li K. Wang

(57) ABSTRACT

Battery protection circuitry and method are disclosed. A battery is protected from a large current overdrawn condition by setting a discharge switch into a controllable conduction state. After the discharge switch is in the controllable conduction state, a tickle discharge current is gradually generated under control of a switch control signal. The trickle discharge current can be used to determine whether the large current overdrawn condition still exists. When the large current overdrawn condition is removed, the discharge switch is turned back on.

10 Claims, 10 Drawing Sheets

MODIFIED FOR TRICKLE DISCHARGE

MODIFIED FOR TRICKLE DISCHARGE

N BITS PROGRAMMABLE REFERENCE CURRENT SOURCE

TRICKLE DISCHARGE FOR BATTERY PACK PROTECTION

CROSS REFERENCE TO RELATED APPLICATION

This application is a continuation-in-part application of and claims the priority to U.S. nonprovisional application Ser. No. 10/832,621, filed Apr. 27, 2004 now U.S. Pat. No. 7,180,268, which claims the priority to U.S. Provisional Application Ser. No. 60/556,254, filed Mar. 25, 2004, the specification of both applications are incorporated herein by this reference.

BACKGROUND OF THE INVENTION

1. Field of the Invention

The present disclosure relates to battery charging/discharge circuits and battery pack protection, and more particularly, to battery charging/discharge circuits capable of trickle precharge and/or trickle discharge. Utility for the present invention can be found in battery charging/discharging/protection systems for portable electronic devices, for example, laptop computers, PDAs, cell phones, and/or any type of electronic device having a rechargeable battery.

2. Description of the Related Art

Rechargeable batteries, especially lithium ion batteries, need to precharge (recovery-charge) from deeply discharged status to avoid stressing the depleted batteries. When a rechargeable battery is deeply discharged and its cell voltage becomes lower than a threshold voltage $V_{UV}$, it cannot be directly charged using large charging current. Instead, a precharge mode is needed. In the precharge mode, a small charging current is used, until the battery voltage is charged larger than the voltage $V_{UV}$, and then it can be charged in normal mode, i.e. charging by larger charging current. For lithium ion battery, the threshold voltage $V_{UV}$ is approximately 2.4V~3.0V for one cell, depending on battery type and manufacturer. The precharging current is about 10 mA~100 mA. However, the normal charging current can be a few hundred milli-Amperes to 1 Ampere depending on the battery capacity.

FIG. 1A depicts the charging profile 50 for a lithium ion rechargeable battery. When the battery voltage is higher than $V_{UV}$, the battery enters into constant current (CC) charging mode, and a large constant current is used to charge the battery (the battery voltage also increases as the battery capacity increases). When the battery voltage increases to $V_{OV}$, which represents overvoltage (normally around 4.2V for a lithium ion battery), the battery enters into a constant voltage (CV) charging mode. In this mode, the charger holds the voltage at $V_{OV}$. When the charging current decreases to a predetermined minimum value, for example 50 mA, the charge procedure is stopped. During the CV charge mode, the charger must regulate the voltage precisely to $V_{OV}$ (to within +/−0.005 V), otherwise the charging current will not taper off with increasing battery capacity. If, for example, the charging output is larger than $V_{OV}$, then over-charging the battery may occur, which may present safety issues with lithium ion batteries.

The conventional circuit 10 to implement precharging is shown in FIG. 1B. A precharge MOSFET 12 in series with a resistor 14 is used for precharging. At the time of precharging, charge FET 16 turns off and precharge FET 12 turns on. Therefore, the precharging current is approximately determined by the voltage difference between charger input voltage VPACK+ and total cell voltage Vcell, VPACK+−Vcell, divided by the serial resistor 14 Rpre. When an AC adapter (not shown) is present and VPACK+ is higher than the cell voltage Vcell, the charging or precharging will start based on the initial voltage of each cell. If the voltage in any cell is lower than the threshold $V_{UV}$, the battery pack will be in the precharging mode. Otherwise normal charging will be taken.

Those skilled in the art will recognize that the circuit 10 of FIG. 1B includes a battery monitor IC 20 that includes circuitry to monitor voltage and current conditions on each of the cells (Cell1, Cell2 ... Cell4) of the battery pack 22. Such circuitry may include a switching network 24 to sample each cell voltage. To control the operation of the precharge MOSFET 12, the conventional circuit 10 includes a comparator 26 that compares a constant reference voltage 28 ($V_{UV}$) with the voltage across each cell, via switches 30.

However, one drawback of the topology depicted in FIG. 1B is that an extra power MOSFET (i.e., MOSFET 12) and resistor 14 are required, which are expensive and increase PCB area. Additionally, with this topology, the lower the cell voltage results in a larger precharging current. Also, the precharging current decreases with the increasing of cell voltage, which translates into longer time to finish precharging.

Additionally, the value of the resistor 14 is typically fixed, and the maximum and minimum precharging current is also typically fixed, and cannot be adjusted to accommodate different battery pack requirements.

Another drawback of this topology is that the battery pack 22 and the MOSFETs are vulnerable to an abnormal condition, such as the VPACK+ terminal is shorted to the VPACK− terminal, or an external reversed charger is attached to the VPACK+ and VPACK− terminals. With this topology, a discharge FET 18 is either turned on to allow discharge or turned off to disable discharge. When the discharge FET 18 is turned on, if an abnormal condition occurs, a large current may be drawn from the battery pack 22 to flow through the discharge FET 18 and the charge FET 16, which in turn will damage the battery pack 22 and/or the MOSFETs.

Alternatively, when the battery pack 22 is removed from an electronic system, for example, and put on a shelf, the discharge FET 18 may be turned off to protect the battery pack 22 from the abnormal condition. However, since the discharge FET 18 is turned off, the battery pack 22 will fail to power the electronic system immediately when the battery pack 22 is plugged back into the electronic system, and hence a mechanical method or an electronic circuit may be needed to inform the circuit 10 to turn on the discharge FET 18. The additional mechanical method or electronic circuit will increase the complexity, price and/or size of the circuit 10. Additionally, the battery pack is still vulnerable to damage caused by the abnormal condition after the battery pack is plugged into the electronic system.

A conventional solution for the battery pack protection is that the discharge FET 18 is turned off to avoid the large current when the abnormal condition happens. After being turned off for a predefined period, i.e. 30 seconds, the discharge FET 18 is turned on again. If the abnormal condition still exists when the discharge FET 18 is turned back on, the large current will flow through the discharge FET 18 and trigger the battery pack protection again. Consequently, the discharge FET 18 is turned off again. Otherwise, the battery pack 22 will operate in a normal discharge mode with the discharge FET 18 turned on. However, if the abnormal condition exists for a long period, the large current will flow through the discharge FET 18 continuously, which will eventually damage the battery pack 22 and/or the MOSFETs.

Thus, it is desirous to have a circuit and method thereof that is capable of trickle precharge and/or trickle discharge, and it is to such a circuit and method that the present invention is primarily directed.

SUMMARY OF THE INVENTION

In one embodiment, there is provided a method for protecting a battery pack from a large current overdrawn condition. The method includes the steps of generating a control signal at a switch control circuit, and generating a trickle discharge current under control of the control signal if the large current overdrawn condition occurs. The trickle discharge current is capable of preventing the large current from being overdrawn from the battery pack.

In another embodiment, there is provided another method for a battery pack from a current overdrawn condition. The method includes the steps of a) turning a discharge switch off when a large current overdrawn condition occurs, b) generating a control signal at a switch control circuit, the control signal having a predefined maximum level, c) generating a trickle discharge current under control of the control signal, the trickle discharge current having a threshold current level and being capable of preventing the large current overdrawn from the battery pack, d) detecting whether the large current overdrawn condition still exists according to the trickle discharge current, the threshold current level and the predefined maximum level, e) repeating the steps of a) to d) if the large current overdrawn condition still exists, and f) turning on the discharge switch if the large current overdrawn condition is removed.

BRIEF DESCRIPTION OF THE DRAWINGS

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein.

DETAILED DESCRIPTION OF THE INVENTION

Figure 2A:
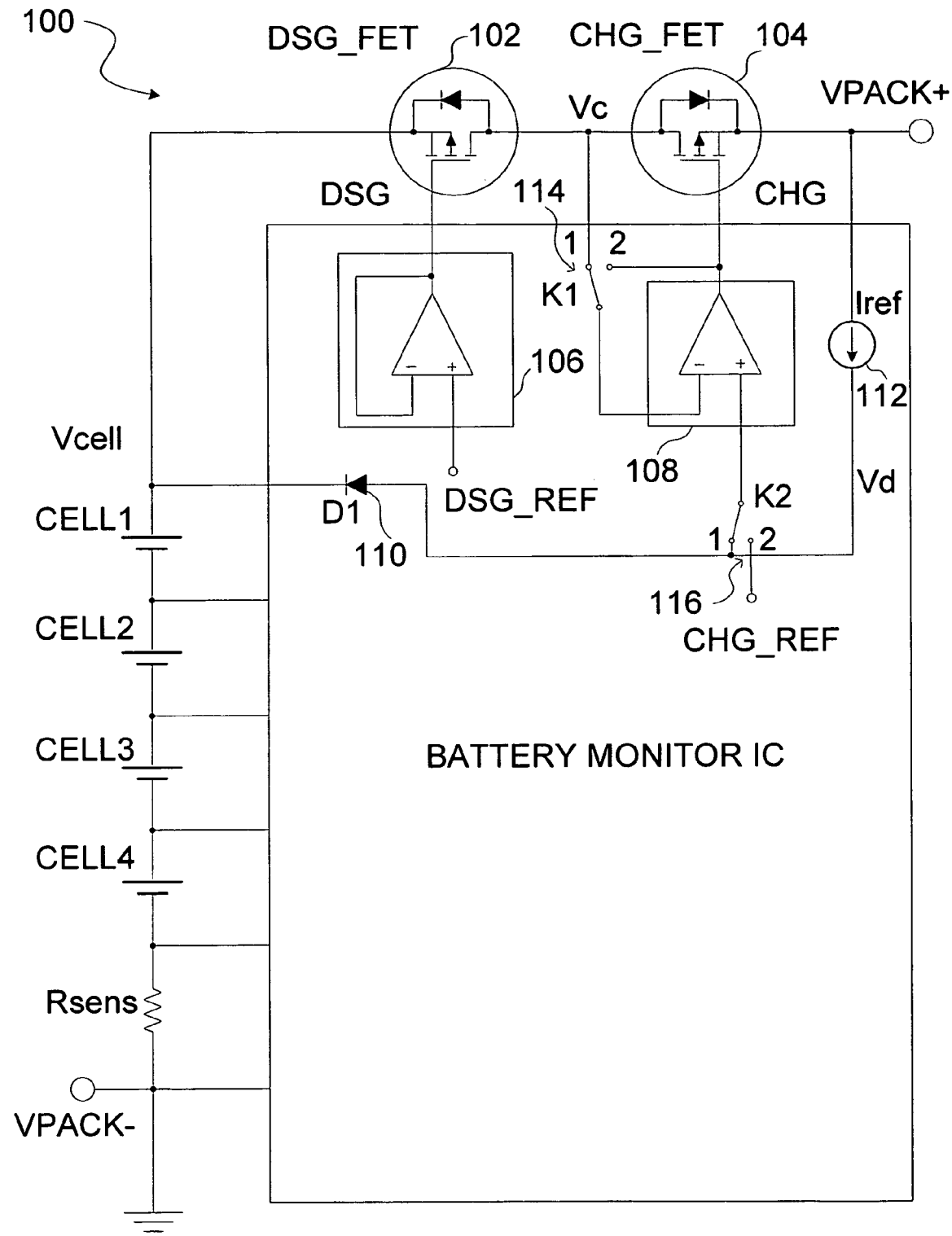
FIG. 2A is one exemplary trickle precharge topology according to the present invention.

FIG. 2A depicts one exemplary trickle precharge topology 100 according to the present invention. In this embodiment, two MOSFETs 104 and 102 (charge FET CHG_FET and discharge FET DSG_FET) may be used. In this embodiment, the charge FET 104 and discharge FET 102 may be placed back-to-back in series in the manner depicted and as understood in the art. In a trickle precharge mode, the discharge FET 102 may be off (non-conducting), but current may still pass through its body diode to the battery cells if the charge FET (CHG_FET) 104 is on (conducting). If the CHG_FET 104 is off, then no current flows from or into the battery cells.

Besides the two MOSFETs, this topology 100 may also include a reference diode D1 110, a discharge driver 106, a charge driver 108, and a reference current source Iref 112. The charge driver 108 and discharge driver 106 may each comprise respective comparators. In a regular charge mode, switches K1 and K2 (114 and 116) are set to position 2. In this position, a charge driving voltage CHG is driven to a point approximately equal to a reference voltage CHG_REF, which operates to fully turn on the charge FET 104. Therefore, the reference voltage CHG_REF is selected in accordance with the turn on requirements of the charge FET 104.

In a trickle precharge mode, switches K1 114 and K2 116 may be set to position 1. When an AC adapter is applied, VPACK+ voltage may rise. The charge FET 104 may be driven into saturation by the charge driver 108, which may mean that the charge FET 104 acts as a variable resistor, and a trickle charge current may flow through the charge FET 104. The charge driver 108 may be adapted to regulate the charge FET (CHG_FET) 104 to force the voltage Vc equal to Vd, which may be set by the diode D1 110 and the reference current source Iref 112.

Vc is defined as the voltage between the MOSFETs 102 and 104. Vc may be set as the input to the (−) terminal of the comparator in the charge driver 108, while Vd (set by Iref and D1) may be set as the input to the (+) terminal. The output signal CHG is Vd−Vc. While Vc may be approximately equal to Vd, the gain of the comparator in the charge driver 108 may be selected such that a large output signal is produced sufficient to cause the charge FET 104 to operate in saturation region. Thus, the charge driver 108 may be adapted to operate during the trickle precharge period to compare the fixed signal (Vd) with Vc.

In forward bias condition, the DC current through the diode D1 110 is given by:

$$Iref = A1 * IS1 * (\exp(Vd1/Vt) - 1)$$

where A1 is diode D1 junction area, IS1 is diode D1 unit reverse saturation current, Vd1=Vd−Vcell is the voltage drop across the diode D1 110, and Vt is diode threshold voltage. The DC current in the body diode of the discharge FET 102 is given by:

$$Ipch = A2 * IS2 * (\exp(Vd2/Vt) - 1)$$

where A2 is the body diode junction area, IS2 is the body diode unit reverse saturation current, Vd2=Vc−Vcell is the voltage drop across discharge FET body diode. IS1 and IS2 are determined by the type of semiconductor device chosen, as is well understood in the art. If Vd and Vc are forced to be substantially equal, then the trickle precharge current is proportional to the reference current Iref, and is given by:

$$Ipch = A2/A1 * (IS2/IS1) * Iref.$$

Preferably, although not required by the present invention, the junction area A2 of the body diode of the charge and discharge FETs 102 and 104 is typically large because of low turn-on resistance and high current requirement, while the junction area A1 of diode D1 is very small in order to save die area. Therefore, a small current Iref (tens of micro-amper) can be used to control larger current Ipch (tens to hundreds of milli-amper), since A2>>A1.

Figure 2B:
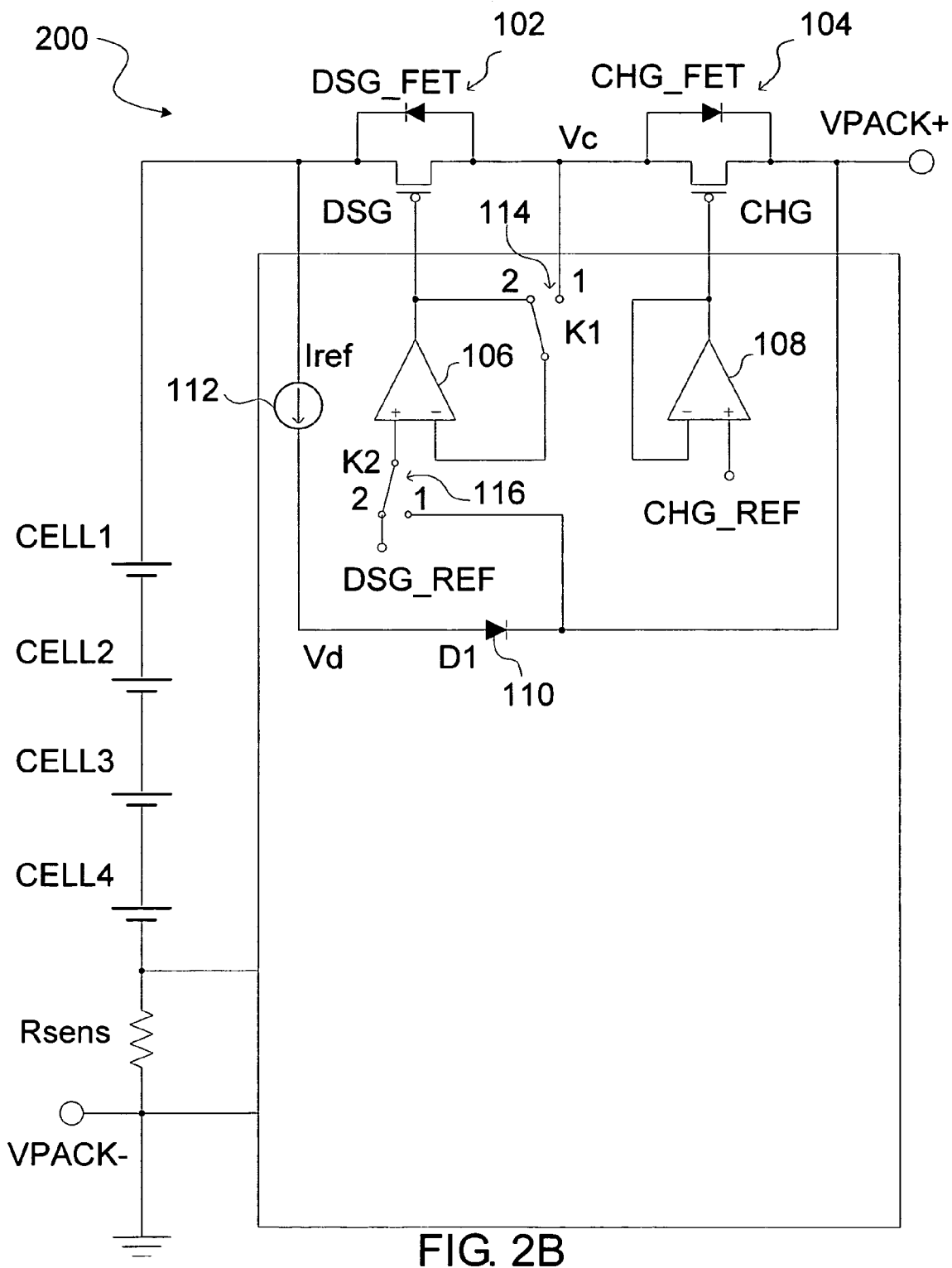
FIG. 2B is one exemplary trickle discharge topology according to the present invention.

FIG. 2B depicts one exemplary trickle discharge topology 200 according to the present invention. This embodiment is similar to the topology 100 depicted in FIG. 2A, except the reference current source 112 and the diode 110 are coupled on the discharge FET 102 side. During a trickle discharge period, the charge FET 104 may be OFF, and a trickle discharge current flows through its body diode. The operation of the topology 200 is otherwise described above with reference to FIG. 2A.

Figure 3A:
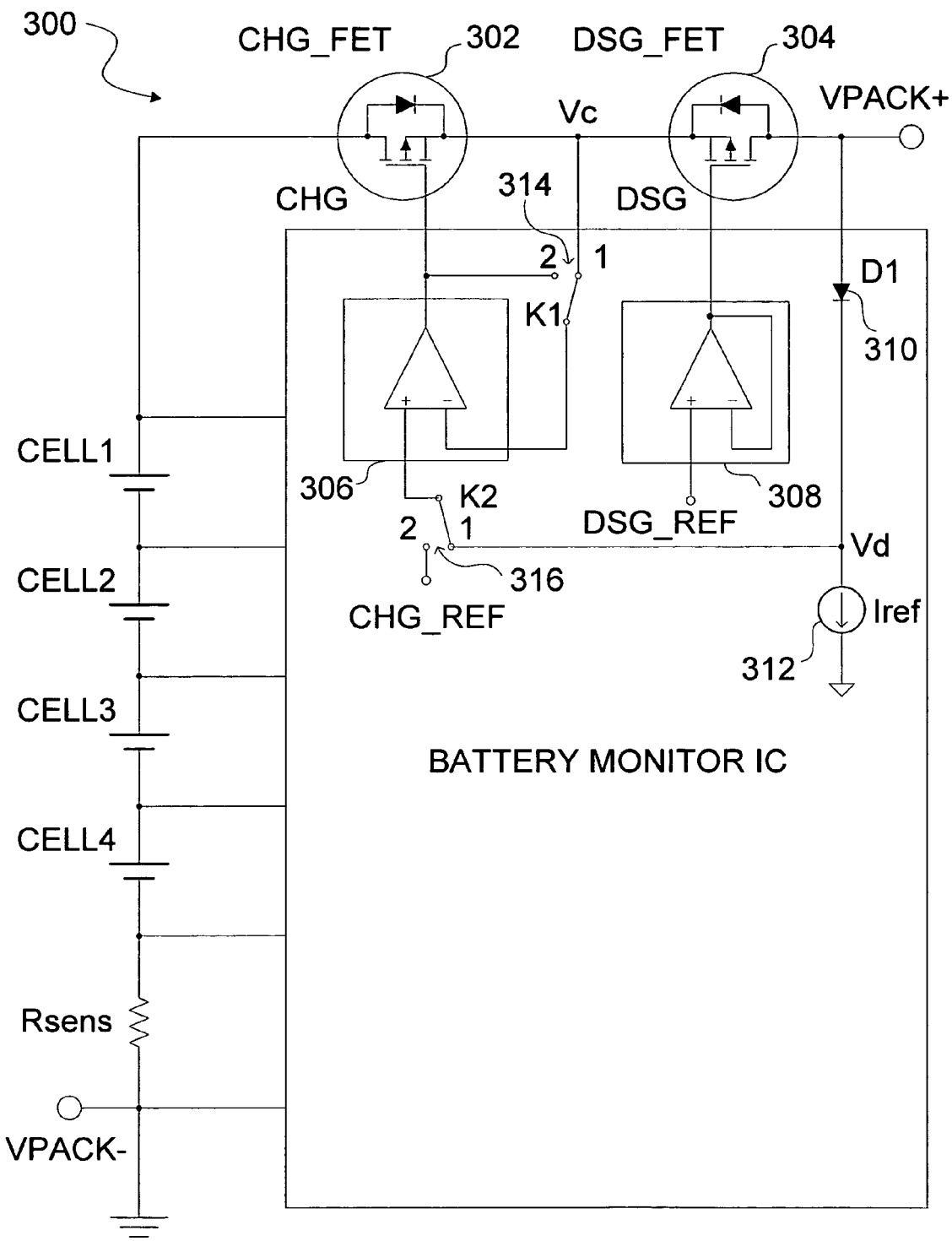
FIG. 3A is another exemplary trickle precharge topology according to the present invention.

FIG. 3A depicts another exemplary trickle precharge topology 300 according to the present invention. In this embodiment, a charge FET 302 and a discharge FET 304 may be placed face-to-face in series instead of back-to-back (as shown in FIG. 2A). The embodiment of FIG. 3A may also include a reference diode D1 310, and in this embodiment a charge driver 306 may be controlled by switches K1 and K2 (314 and 316).

In the normal charge mode, switches K1 and K2 may be set to position 2, so the gate voltage of the charge FET 302 is driven to CHG_REF, which may operate to fully turn on the charge FET 302. In the trickle precharge mode, the discharge FET 304 may be off, and K1 and K2 may be set to position 1. In this case the charge driver 306 may operate to regulate the charge FET 302 to force voltage Vc substantially equal to Vd. In forward bias condition, the DC current of the diode D1 310 is given by:

$$Iref = A1 * IS1 * (exp(Vd1/Vt) - 1)$$

where A1 is diode D1 junction area, IS1 is diode D1 unit reverse saturation current, Vd1=VPAK+−Vd is the voltage drop across the diode D1, and Vt is diode threshold voltage. The DC current in the body diode of the discharge FET 304 will be:

$$Ipch = A2 * IS2 * (exp(Vd2/Vt) - 1)$$

where A2 is the body diode junction area, IS2 is the body diode unit reverse saturation current, Vd1=VPACK+−Vc is the voltage drop across discharge FET body diode. IS1 and IS2 are determined by the type of semiconductor device chosen, as is well understood in the art. If Vd and Vc are forced equal, then the trickle precharge current is given by:

$$Ipch = A2/A1 * (IS2/IS1) * Iref.$$

Figure 3B:
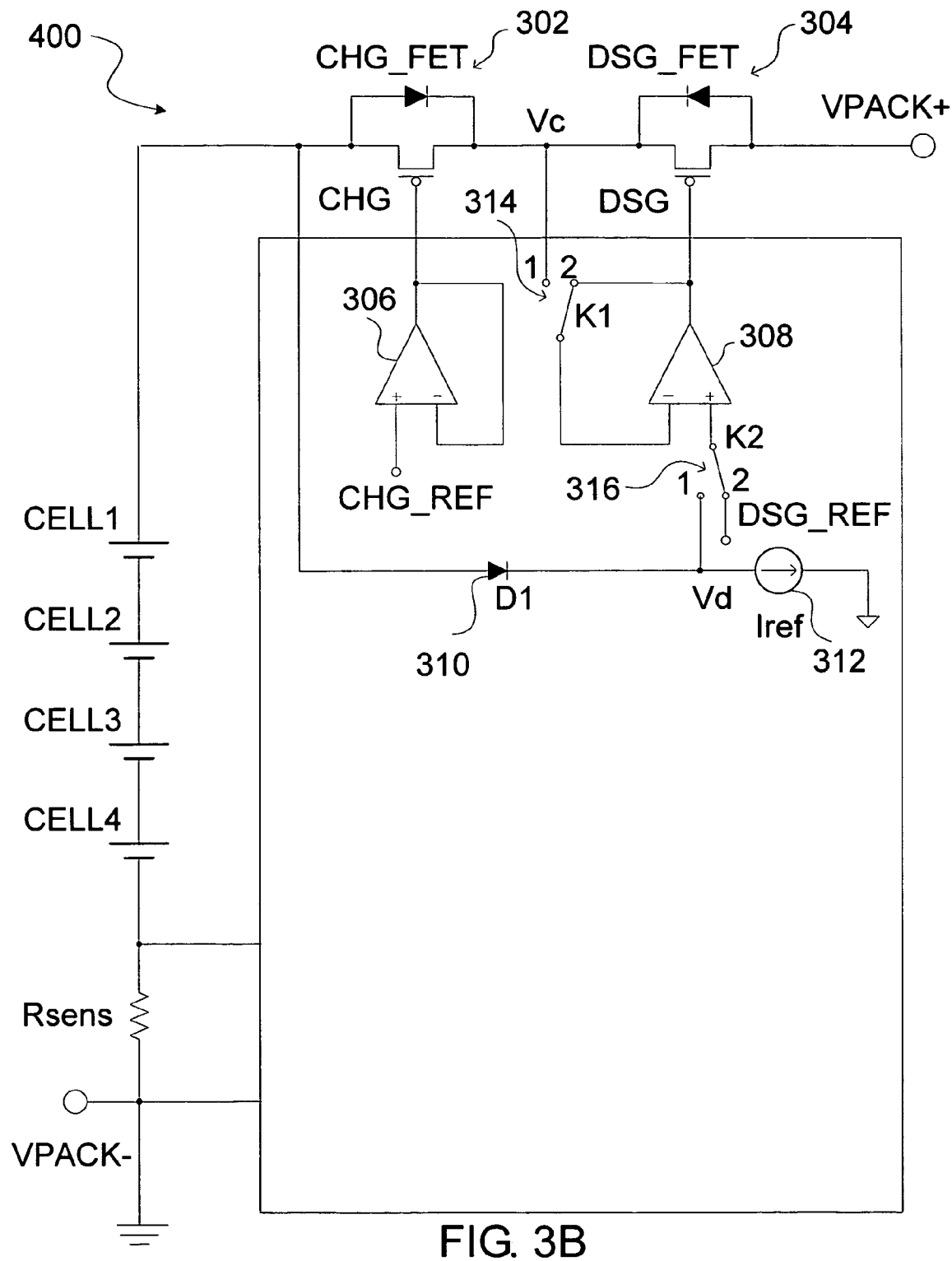
FIG. 3B is another exemplary trickle discharge topology according to the present invention.

FIG. 3B depicts one exemplary trickle discharge topology 400 according to the present invention. This embodiment is similar to the topology 300 depicted in FIG. 3A, except the reference current source 312 and the diode 310 are coupled on the discharge FET 302 side. During the trickle discharge period, the charge FET 302 may be OFF, and the discharge current may flow through the body diode of the charge FET 302. The operation of the topology 400 is otherwise described above with reference to FIG. 3A.

In order to speed up the trickle precharge process, the trickle precharge current Ipch can be readily adjusted based on the cell voltage. The higher the cell voltage, the larger the trickle precharge current is set by programming the reference current Iref. The programmable reference current source in FIG. 4 may be adapted to generate the reference current based on the cell voltage, as would be well understood in the art.

Figure 4:
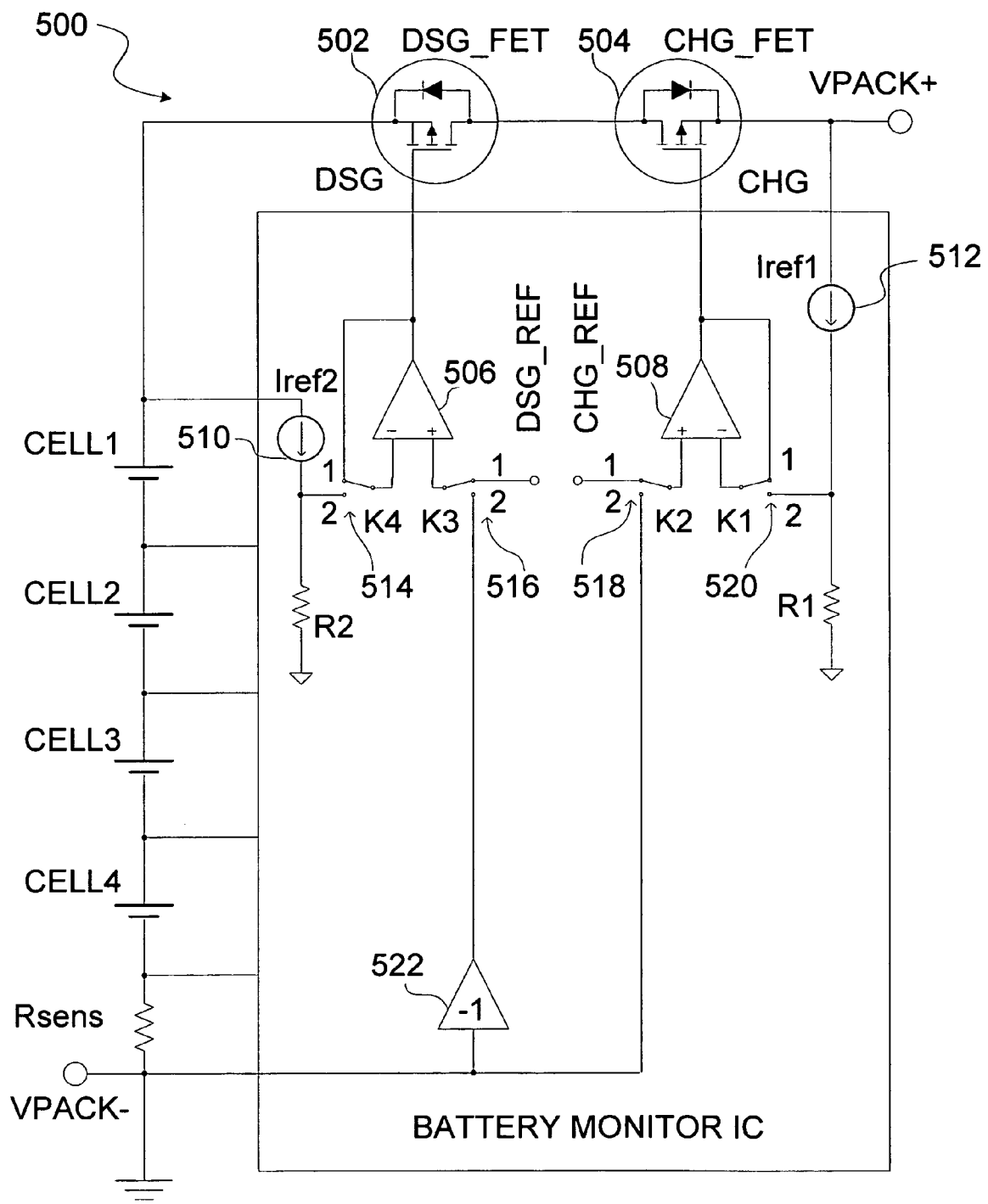
FIG. 4 is another exemplary trickle precharge topology according to the present invention.

Still another exemplary trickle precharge topology 500 is depicted in FIG. 4. In this exemplary embodiment, a charge FET 504 and a discharge FET 502 may be placed back-to-back in series in the manner depicted and as understood in the art. In a trickle precharge mode, the discharge FET 502 may be off (non-conducting), but the current can still pass through its body diode to the battery cells if charge FET(CHG_FET) 504 is on (conducting). If the CHG_FET 504 is off, then no current flows from or into the battery cells.

This embodiment may also include a reference resistor R1, a discharge driver 506, a charge driver 508, and a reference current source Iref1 512. The charge driver 508 and discharge driver 506 may include respective comparators. In a regular charge mode, switches K1 and K2 (520 and 518) may be set to position 1. In this position, a gate driving voltage CHG may be driven to a point approximately equal to a reference voltage CHG_REF, which may operate to fully turn on the charge FET 504. Therefore, the reference voltage CHG_REF may be selected in accordance with the turn on requirements of the charge FET 504.

When the trickle charge (i.e., trickle precharge) is needed, switches K1 and K2 may be connected to node 2. The input to the comparator in the charge driver 508 in this case may be the voltage across Rsens (+) and the voltage drop across R1 (as generated by Iref1 512). The gain of the comparator in the charge driver 508 may be selected to be large (e.g., 80 dB) so that the voltage drop from Iref1 across the resistor R1 will be approximately equal to the voltage drop from trickle charge current Ipch across the sense resistor Rsens.

The trickle precharge current is given by:

$$Ipch = Iref1 * R1/Rsens$$

where Iref1 is a programmable current reference source. Usually Rsens is very small (for example on the order of 10 to 20 mOhms), while R1 may be selected to be in the order of 10 Ohms. Therefore, the ratio R1 over Rsens can be very large, and thus a small reference current Iref1 can be used to generate a relatively large trickle precharge current because of large gain of R1/Rsens.

In the embodiment of FIG. 4, during the trickle precharge mode, the discharge FET 502 can be fully turned on, thereby eliminating the diode forward biasing voltage drop between VPACK+ and battery pack voltage. In this mode, switches K4 514 and K3 516 may be set to position 1 thereby driving the discharge FET 502 with the discharge reference voltage to fully turn on the discharge FET 502 (in a manner described above).

Figure 5:
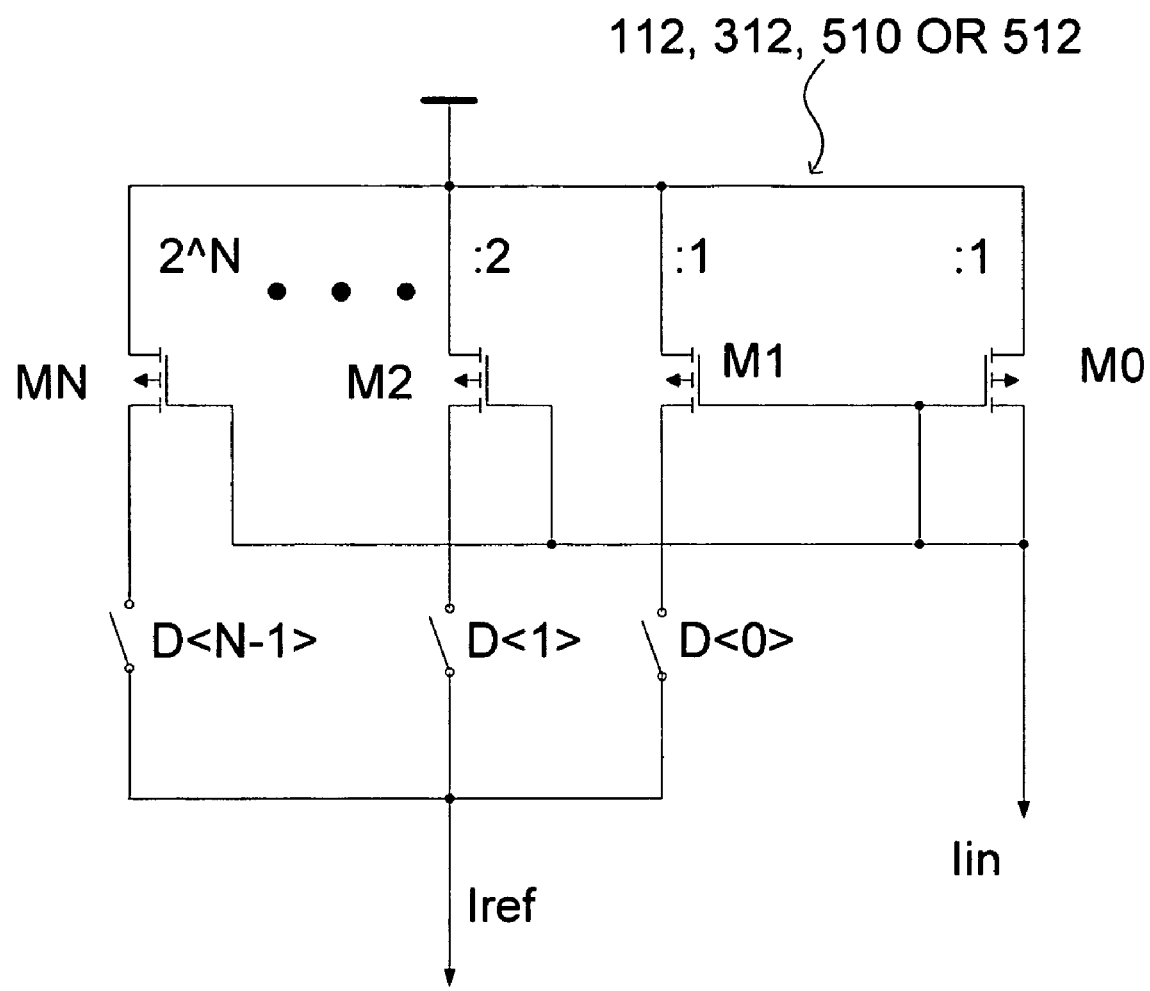
FIG. 5 is an exemplary programmable current source.

Still with reference to FIG. 5, in the normal discharge mode, switches K3 and K4 may be connected to node 1, respectively. In this manner, the discharge driver 506 may be configured as a buffer and drive the discharge FET 502 to fully turn on. When in the trickle discharge mode, switches K3 and K4 may connect to node 2. The voltage drop from Iref2 across the resistor R2 may be approximately equal to the voltage drop across the sense resistor, Rsens, because of the high gain of the discharge driver 506. So, the trickle discharge current is given by:

$$Idsg = Iref2 * R2/Rsens$$

where Iref2 is a programmable current reference source. Usually Rsens may be very small, so the ratio R2 over Rsens can be very large, and thus a small reference current Iref2 can be used to generate relative large trickle discharge current because of large gain R2/Rsens. Because the current direction is reversed during discharge, the voltage drop across sense resistor Rsens and voltage drop across R2 may have reversed polarity. Accordingly, a polarity reversing circuit 522 may be provided to reverse the polarity of the current across Rsens.

In this embodiment, during the trickle charge period, the discharge FET 502 can be fully turned on. So the diode forward biasing voltage drop is eliminated between VPACK+ and battery pack voltage. Likewise, during the trickle discharge period, the charge FET 504 may be fully turned on to eliminate the diode forward biasing voltage drop between the battery pack voltage and VPACK+.

In the present invention, once the MOSFETs and the diode are fixed, Ipch can still be adjusted by the programmable current source (Iref) 112, 312, 510 and/or 512. One exemplary circuit topology for a programmable current source is depicted in FIG. 5. The circuit of FIG. 5 may be adapted to generate the current Iref with ratio current mirrors, as is well understood in the art. Of course, programmable reference current sources are well known in the art and can be implemented in a variety of ways, in addition to the circuit of FIG. 5.

Figure 6:
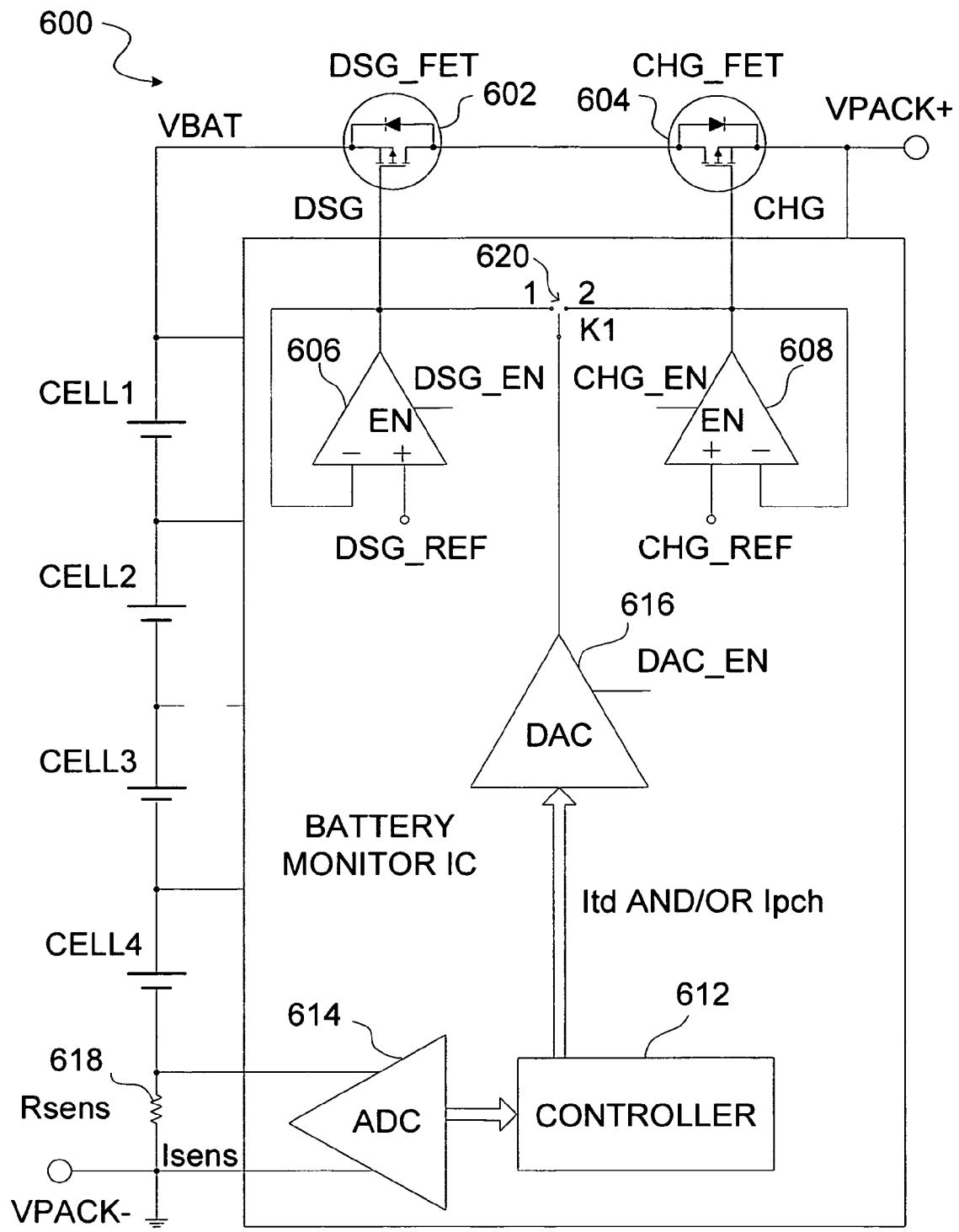
FIG. 6 is an exemplary trickle precharge and trickle discharge topology.

One exemplary trickle precharge and trickle discharge topology 600 is depicted in FIG. 6. In this embodiment, a charge FET 604 and a discharge FET 602 may be placed back-to-back in series in the manner depicted and as understood in the art, or alternatively, face-to-face in series as described above. In this exemplary embodiment, a digital to analog converter circuit (DAC) 616 may be used to generate a FET driving voltage, as described more fully below.

This embodiment includes a control loop that may comprise an analog to digital converter circuit (ADC) 614, a controller 612 and the digital to analog converter circuit (DAC) 616. Current sensed across a sense resistor Rsens 618 may be received by the ADC 614. The ADC 614, in turn, may generate digital signals indicative of the sensed current and transmit those signals to the controller 612. In operation, if the current through the sense resistor 618 is smaller than a predefined threshold, the controller may send data to the DAC 616 to increase the corresponding FET driving voltage. Otherwise it will send data to the DAC 616 to decrease the FET driving voltage until the sensed current and the predefined current are approximately equal.

In normal charge or discharge mode, the DAC 616 may be disabled (via a DAC_EN signal received by the DAC 616), and the charge FET 604 and discharge FET 602 are high. A charge driver 608 may drive the gate voltage of the charge FET 604 to a CHG_REF value, and fully turn on the charge FET 604. A discharge driver 606 may drive the gate voltage of the discharge FET 602 to a DSG_REF value, and fully turn on the discharge FET 602.

In a trickle discharge mode, switch K1 620 may be connected to node 1. The discharge driver 606 may be disabled (DSG_EN is low) with a high impedance output and the conduction state of the discharge FET 602 may be controlled by the DAC 616. Thus, the discharge FET 602, the sense resistor Rsens 618, the ADC 614 and the DAC 616 may comprise the control loop. By controlling the turn-on resistance of the discharge FET 602, the present embodiment may be capable of adjusting the trickle discharge current to a desired value (as may be preprogrammed into the controller 612). The turn-on resistance of MOSFETs can be adjusted by adjusting the gate driving voltage.

In one exemplary embodiment, if the desired trickle discharge current is set to Itd, then the corresponding control code for the DAC 616 can be obtained using SAR (successive approximation register) method. The DAC MSB bit is set to high first, if the current Isen through the sense resistor Rsens 618 is larger than Itd, then the MSB bit is set to low, otherwise it is kept high. Then the second MSB bit is set high, if Itd>Isen, the second MSB bit is set to low, otherwise it is kept high. This successive approximation will continue until the DAC LSB is set. So a corresponding control code may be saved in a register (not shown) that may be accessed by the controller 612. If Itd is fixed for a given battery pack, then the control code may also be fixed. Whenever trickle discharge is needed, the controller 612 may send the programmed control code to the DAC 616, and thus, the battery pack will have the capability to deliver Itd to an external load. If the trickle discharge current needs to be adjusted, the control loop described herein may be used to increase or decrease the control code accordingly. During trickle discharge mode, the charge driver 608 can be enabled or disabled. The difference is that the trickle discharge current will flow through the charge FET 604 or through its body diode respectively.

In a trickle charge mode, switch K1 620 is connected to node 2. The charge driver 608 may be disabled (CHG_EN is low). The conduction state of the charge FET 604 may be controlled by the DAC 616. In this mode, the charge FET 604, the sense resistor Rsens 618, the ADC 614 and the DAC 616 may comprise the control loop. By controlling the turn-on resistance of the charge FET 604, the present embodiment may be capable of adjusting the trickle charge current to a desired value. Precharge current is often a fixed value. In this mode, the present embodiment may generate a control code (using the above-mentioned SAR method) and save this control code in the memory. For trickle precharge current, the value may vary in a range from high limit to low limit, and thus, the control code may be adapted to vary between $C_{TCH}$ and $C_{TCL}$, thus permitting the trickle charge current to be adjusted accordingly. During trickle charge mode, the discharge driver 606 can also be enabled or disabled. The difference is that the trickle charge current will flow through the discharge FET 602 or through its body diode respectively.

The trickle discharge mode discussed above can further be utilized to implement battery pack short-circuit/over-current protection. A first approach to battery pack protection is effective when the battery pack is taken out of an electronic system, or in other words, when the battery pack is in an idle mode. Unlike the conventional approach of keeping the discharge FET 602 off, the first approach sets the discharge FET 602 into a controllable conduction state. While the discharge FET 602 is in the controllable conduction state, even if a short circuit condition occurs, i.e. the VPACK+ terminal is short to the VPACK− terminal, a large current surge is prevented by the turn-on resistance of the discharge FET 602. Similarly, a large current surge is also prevented when an over-current condition occurs. Actually, when the short-circuit/over-current condition occurs, a trickle discharge current will flow through the discharge FET 602 and the trickle discharge current can be set to a desired value that can ensure the safety of the battery pack and the MOSFETs. The trickle discharge current, for example, 100 mA, is capable of driving an external controller embedded in the electronic system, which is different from the controller 612 shown in FIG. 6. When the battery pack is plugged into the electronic system. The system embedded controller then detects the insertion of the battery pack and informs the battery pack to operate in the normal discharge mode. In this way, the extra mechanical method or electronic circuit is not needed to detect and inform the battery insertion. However, with the first approach, when the battery pack is plugged in the electronic system, no battery short-circuit/over-current protection is further provided. Thus, the first approach is beneficial only when the battery pack is taken out of the electronic system.

Figure 7:
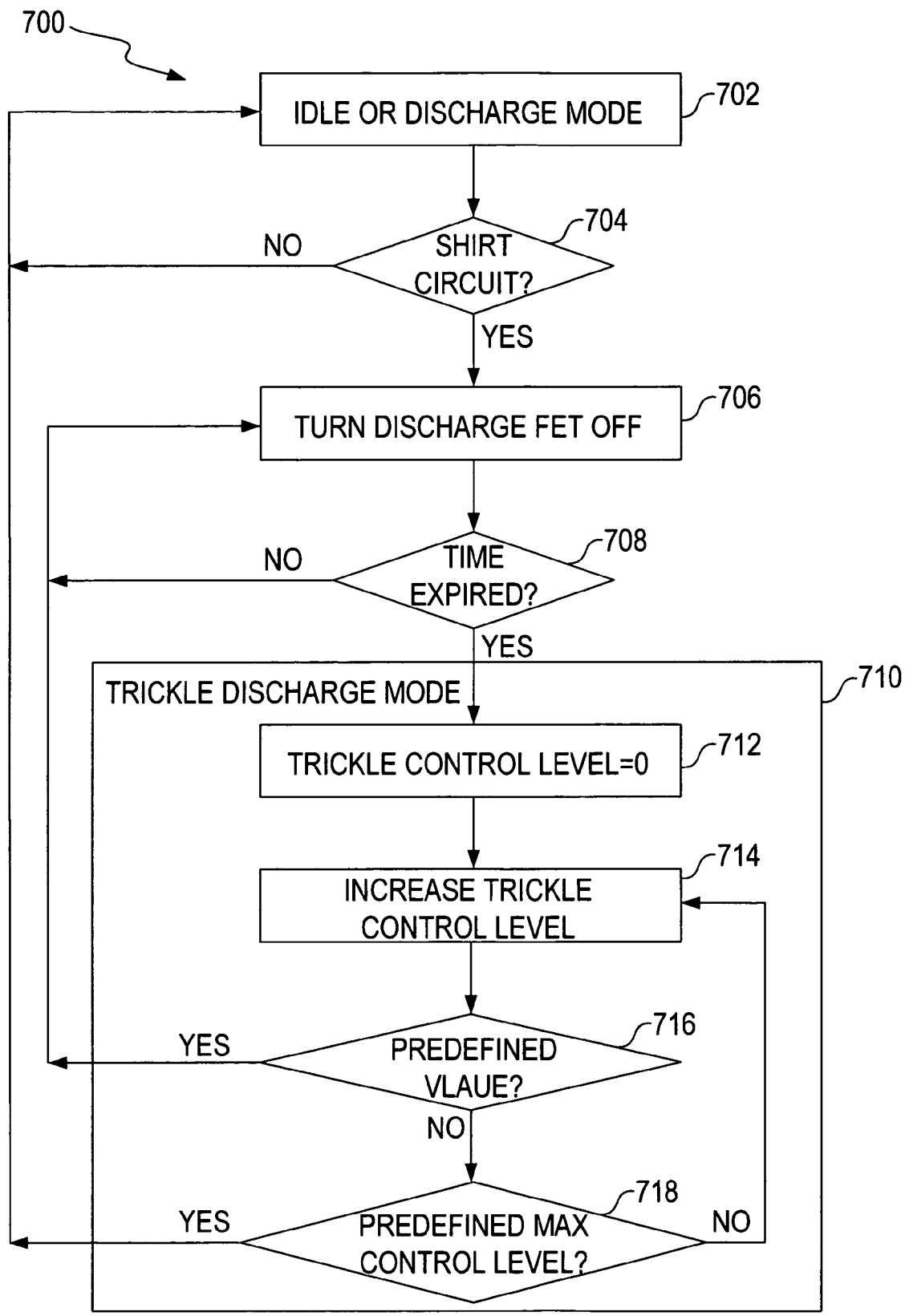
FIG. 7 is an exemplary flow-chart for battery pack short-circuit/over-current protection according to one embodiment of the invention.

A second approach to battery pack protection is depicted by a flow-chart 700 shown in FIG. 7. The second approach is effective when the battery pack is taken out of the electronic system as well as when the battery pack is plugged in the electronic system. At the beginning, as illustrated in step 702, the battery pack is either in the idle mode, if it is out of the electronic system, or in the normal discharge mode, if it is plugged in the electronic system. Regardless of which mode the battery pack is in, a judgment on short-circuit/over-current occurrence is conducted in step 704. If no short-circuit/over-current condition occurs, then the battery pack will stay in the idle or discharge mode. If there is a short-circuit/over-current condition, then the discharge FET 602 is turned off immediately in step 706. Typically, the discharge FET 602 can be turned off within micro-seconds. Then, in step 708, if the discharge FET 602 has been turned off for a predefined period, fox example 25 seconds, unlike the traditional approach of fully turning on the discharge FET 602, the discharge FET 602 will be shifted to the controllable conduction state. While the discharge FET 602 is in the controllable conduction state, the battery pack will operate in the trickle discharge mode with a trickle discharge current flowing through the discharge FET 602 in step 710. If the predefined period has not expired, the discharge FET 602 will still stay in the off status.

Those skilled in the art will recognize that to realize step 708, the embodiment shown in FIG. 6 may comprise a battery management firmware and a timer. The battery management firmware is capable of monitoring hardware action. The timer has a preset time (e.g., 25 seconds). If the short-circuit/over-current condition occurs, the battery management firmware will notice that the discharge FET 602 has been turned off and then enable the timer. If the preset time of the timer expires, the management firmware then knows that the discharge FET 602 has been turned off for the predefined period.

In the trickle discharge mode, the DAC 616 in FIG. 6 provides the gate driving voltage to the discharge FET 602. Driven by the gate driving voltage, the discharge FET 602 is set into the controllable conduction state. Through adjusting the gate driving voltage, the turn-on resistance of the discharge FET 602 is adjusted and consequently the trickle discharge current that flows through the discharge FET 602 is adjusted.

In the trickle discharge mode, there may include the following sub-steps. At the beginning, under control of the controller 612, the gate driving voltage from the DAC 616 is set to 0V in step 712. Then, the gate driving voltage is increased gradually in step 714. According to a characteristic of the MOSFETs that is understood by those skilled in the art, the turn-on resistance of the discharge FET 602 will be decreased gradually with the increment in the gate driving voltage, and in turn the trickle discharge current flowing through the discharge FET 602 is increased gradually. Each time the gate driving voltage is increased, the corresponding trickle discharge current is sensed across the resistor Rsens 618 and then used for determining whether the short-circuit/over-current condition still exists.

Specifically, in step 716, the trickle discharge current is compared with a predefined current, fox example, 40 mA, to determine whether the short-circuit/over-current condition still exists. If the trickle discharge current is larger than the predefined current, it can be concluded that the short-circuit/over-current condition still exist. Then, the system illustrated in FIG. 6 ill restart battery pack protection by operating from step 706. If the trickle discharge current is smaller than the predefined current, the gate driving voltage will be compared with a predefined maximum control level in step 718. Actually, the gate driving voltage will not increase infinitely but be limited to the predefined maximum control level. In step 718, if the gate driving voltage reaches the predefined maximum control level, it can be concluded that the short-circuit/over-current condition no longer exists, and the battery pack will return to the idle or normal discharge mode in step 702. Otherwise, the battery pack will execute steps 714, 716 and 718 repeatedly until existence of the short-circuit/over-current condition is determined in either step 716 or step 718.

The predefined current herein is set by considering the power dissipation capability of MOSFETs. For the battery pack with four cells shown in FIG. 6, the predefined current may be set to 40 mA and therefore the maximum power dissipation of the discharge FET 602 is approximately 680 mW, which is a safe value for power MOSFETs.

Alternatively, the voltage at the VPACK+ terminal can be utilized to determine whether the short-circuit/over-current condition still exists. The voltage at the VPACK+ terminal is sensed and then compared with a predefined voltage, fox example, 100 mV, in step 716. If the voltage at the VPACK+ terminal is smaller than the predefined voltage, it can be determined that the short-circuit/over-current condition still exists. Otherwise, the gate driving voltage will be compared with the predefined maximum control level in step 718. The predefined voltage at the VPACK+ terminal is set by considering the noise and the internal impedance. For the embodiment in FIG. 6, the predefined voltage is set as 100 mV, which is a good trade-off between short-circuit/over-current condition judgment and account of noise and internal impedance.

Figure 1A:
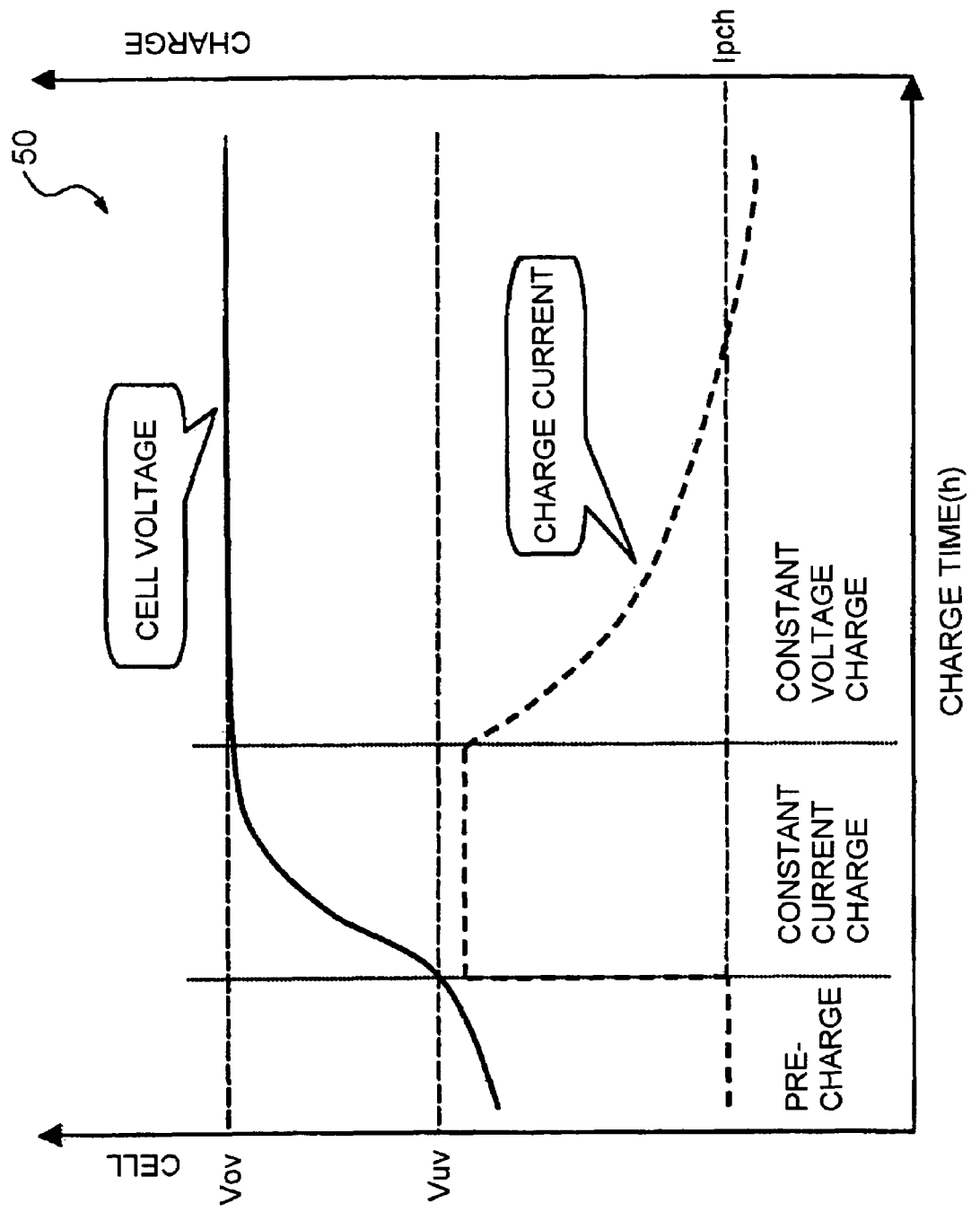
FIG. 1A is graphical representation of a typical charging profile for a lithium ion battery.
Figure 1B:
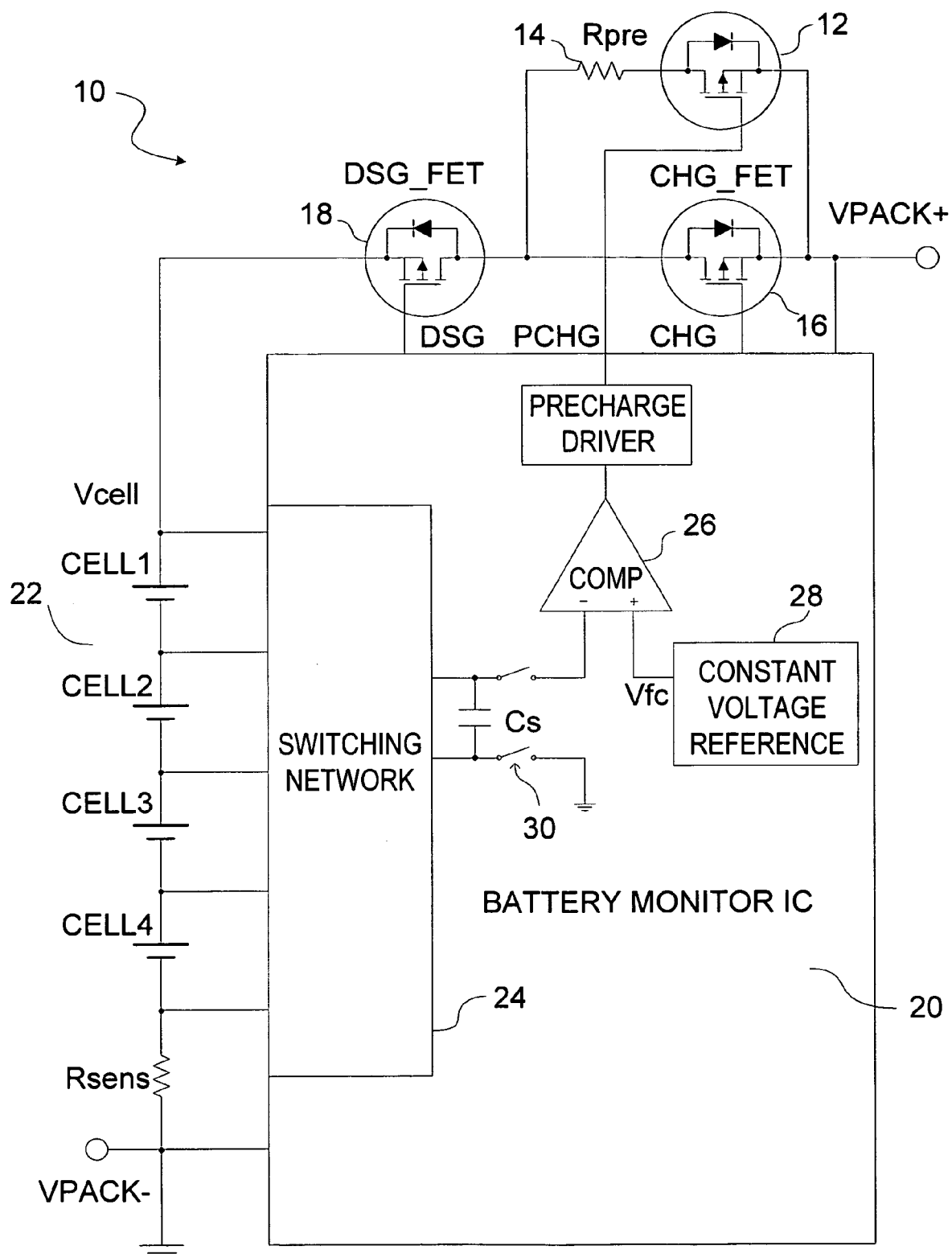
FIG. 1B is a conventional battery precharge circuit.

From FIG. 1A, we know that during the precharge period and constant voltage (CV) charge period, the charge current may need to be controlled. In conventional circuits, an additional precharge FET is needed to control the precharge current. In such a conventional circuit, the CV charge must fully rely on the charger to accurately regulate the charge voltage to Vov, then the charge current will taper.

In the present invention, the precharge function can be implemented without the extra precharge FET. Furthermore, in order to speed up the precharge process, the precharging current Ipch can be easily adjusted based on the cell voltage. The higher the cell voltage, the larger the precharging current is set by programming the reference current Iref, such as described herein with reference to FIG. 2A, FIG. 3A and FIG. 4, or the control code approach described in FIG. 6.

Advantageously, trickle precharging current control, as described in numerous embodiments herein, can be utilized during a CV time period where trickle precharge circuitry may be capable of generating a trickle charge current based on the cell voltage. In this manner, the CV charge current taper does not need to rely on the charger regulated voltage Vov. Therefore, advantageously, the present disclosure provides several embodiments which may obviate the need for an expensive, accurate voltage regulation charger. Indeed, a simple AC adapter can be used to charge the lithium ion battery. Because in CV charge period, even the charger cannot hold the constant voltage to Vov, but the charging current is limited to the pre-programmed trickle current value, which is determined based on the cell voltage. So, overcharging won't happen. This charging current limitation can be used as a secondary over-voltage protection (by setting the current limit slightly above the actual observed current for the desired $V_{UV}$), or as the primary over-voltage protection (by regulating the charge current until the exact desired $V_{UV}$ is obtained).

With the trickle discharge capability of the invention, a better short-circuit/over-current protection for the battery pack is possible. In prior arts, the discharge FET either fully turn on to allow discharge or fully off to disable discharge. When the battery pack is out of the electronic system, for example, put on the shelf, then the discharge FET either keep ON to prepare for powering the electronic system anytime that the battery pack may plug into the electronic system. In this case, if something abnormal happens, such as there VPACK+ terminal was short to the VPACK− terminal, a large current may draw from the battery, which in turn will damage the battery; or the discharge FET keep OFF to protect the battery from short-circuit/over-current condition. But this will prevent the battery to power the system when the battery pack is plugged into the system. Some kind of mechanical method may be needed to inform the battery back to turn on the discharge FET. This will cause some inconvenience to the customer.

With this invention, we can put the battery pack to trickle discharge mode when the battery is out of the electronic system. The trickle discharge current value can be chosen to be large enough, say 100 mA, to power the system embedded controller when the battery pack is plugged into the electronic system. Then the system embedded controller will detect that the battery is present and inform the battery to transit to normal discharge mode. With the discharge FET limiting the current to the predefined trickle discharge current, say 100 mA, even the VPACK+ terminal shorted to the VPACK+ terminal, a large current surge is prevented.

Moreover, regardless of whether the battery pack is out of the electronic system or in the electronic system, with this invention, the battery pack can be protected from the abnormal condition, such as short-circuit/over-current condition. At the beginning, the discharge FET is turned off when something abnormal happens. Then, after being turned off for the predetermined period, the discharge FET is set into the controllable conduction state, instead of being fully turned on as the conventional approach does. Thus, the battery pack will operate in the trickle discharge mode. The gate driving voltage is gradually increased, and the corresponding trickle discharge current increases accordingly. During the process, if the corresponding trickle discharge current becomes larger than a predefined current, fox example, 40 mA, it can be concluded that the abnormal condition still exists, and thus the discharge FET will turn off again and the battery pack will repeat the operation above. If the gate driving voltage has increased to a predefined maximum control level and the corresponding trickle discharge current has not reach the predefined current yet, it can be determined that the abnormal condition is eliminated and the battery pack can operate in the normal discharge mode.

The trickle discharge and trickle charge capability is also very useful to support multiple battery system. As the electronics device is hungry for more power and for more features, multiple battery packs will be more popular. When the multiple battery packs discharge simultaneously, they can provide more power to the system, also it will decrease the battery internal impedance because of multiple battery packs parallel together, to increase efficiency. But multiple battery discharge simultaneously has a stringent premise, those multiple batteries have to have exactly the same voltage. Otherwise, even the two battery packs just have very small voltage difference, say 10 mV, because of the very small resistance of the power bus, say 2 milliohm, then it will have a big current, 5 amperes, which flows from the higher voltage battery pack into the lower voltage battery pack. In practice, multiple battery packs are very hard to have the same voltage, also it is very hard to say the two battery packs are at the same voltage even with a very accurate ADC to monitor the battery voltage, because the battery pack voltage varies with the discharge current. With trickle discharge function enabled, we can solve this problem as following (we take two battery packs as an example).

The system has two battery packs, pack A and pack B. At beginning, pack A voltage is higher than pack B voltage; pack A discharges first to power the system, and the voltage of pack A drops gradually. The discharge FET of pack B is OFF to disable discharge; when pack A voltage drops to the same as pack B voltage, we can set pack B either in trickle charge mode or in trickle discharge mode. If we put pack B in trickle charge mode, we fully turn on the discharge FET, but drive the charge FET to its saturation range and use the charge FET as a current limit resistor; if we put pack B in trickle discharge mode, we fully turn on the charge FET, and drive the discharge FET to its saturation range and use the discharge FET as a current limit resistor. For more safety reason, we can set the trickle charge code $C_{TC}$ or the trickle discharge code $C_{TD}$ to a small current value. So the equivalent resistance of the charge FET or the discharge FET is bigger. Because the pack A is discharging but they pack B stays idle, so the real pack A voltage will be higher than pack B voltage even though their measured voltage value is equal. So, pack A will charge pack B. However, the charge current is limited by the resistance of the charge FET (if we put pack B in trickle charge mode) or the discharge FET (if we put pack B in trickle discharge mode). The limited current is determined by control code $C_{TC}$ or $C_{TD}$. We also monitor this charging current by the ADC inside pack B; When the voltage difference between pack A and pack B gets smaller and smaller, the charge current from pack A to pack B also gets smaller and smaller. When this charge current is smaller than a pre-determined value, say 10 mA, we can transit pack B from trickle charge mode or trickle discharge mode to normal discharge mode.

Accordingly, there has been disclosed programmable trickle precharge and/or trickle discharge circuitry and methodology that provide more flexibility, fewer components, and higher efficiency to finish precharging as compared with a conventional topology. It should be understood that the switches (K1, K2 and/or K3 and K4) may be controlled by the battery monitor IC to put the programmable trickle charge circuits of FIGS. 2A and 2B into a trickle precharge mode or a normal charge mode based on the level of charge on the battery cells (deeply discharged requires a trickle charge mode). It should be further understood that the topologies depicted herein may be implemented using discrete components and/or integrated into an IC. The present invention may be adapted for any portable electronic device (portable computer, cell phone, PDA, etc.) that uses rechargeable batteries.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method for protecting a battery pack from a current overdrawn condition, comprising the steps of:
   a) turning a discharge switch off when a large current overdrawn condition occurs;
   b) generating a control signal at a switch control circuit formed by a charge PET connected back-to-back to a discharge PET, the charge PET being connected by a charge driver and the discharge PET being connected by a discharge driver, the control signal having a predefined maximum level;
   c) generating a trickle discharge current under control of the control signal, the trickle discharge current having a threshold current level and being capable of preventing the large current overdrawn from the battery pack;

d) detecting whether the large current overdrawn condition still exists according to the trickle discharge current, the threshold current level and the predefined maximum level;

e) repeating the steps of a) to d) if the large current overdrawn condition still exists; and f) turning on the discharge switch if the large current overdrawn condition is removed.

2. The method of claim 1, further comprising the steps of:
setting a timer; and
generating the trickle discharge current when the timer expires.

3. The method of claim 1, wherein the step of generating the trickle discharge current further comprising the step of setting the discharge switch into a controllable conduction state under control of the control signal.

4. The method of claim 1, further comprising the step of adjusting the trickle discharge current according to the control signal.

5. The method of claim 4, wherein the step of adjusting the trickle discharge current further comprising the steps of:
adjusting a resistance of the discharge switch according to the control signal; and
adjusting the trickle discharge current according to the resistance of the discharge switch.

6. The method of claim 1, wherein the large current overdrawn condition still existing if the trickle discharge current is at least equal to the threshold current level.

7. The method of claim 1, wherein the large current overdrawn condition is removed if the control signal is at least equal to the predefined maximum level.

8. The method of claim 1, wherein the step (d) further comprising the steps of:
a) sensing the trickle discharge current;
b) comparing the trickle discharge current with the threshold current level;
c) comparing the control signal with the predefined maximum level if the trickle discharge current is smaller than the threshold current level;
d) increasing the control signal if the control signal is smaller than the predefined maximum level;
e) repeating steps a) to d) if the trickle discharge current is smaller than the threshold current level and the control signal is smaller than the predefined maximum level.

9. The method of claim 1, wherein the step (d) further comprising the steps of:
a) sensing a voltage at a positive terminal of the battery pack;
b) comparing the voltage with a threshold voltage level;
c) comparing the control signal with the predefined maximum level if the voltage is larger than the threshold voltage level;
d) increasing the control signal if the control signal is smaller than the predefined maximum level; and
e) repeating steps a) to d) if the voltage is larger than the threshold voltage level and the control signal is smaller than the predefined maximum level.

10. The method of claim 9, wherein the large current overdrawn condition still existing if the voltage is at most equal to the threshold voltage level.

* * * * *